United States Patent
Piesco

(10) Patent No.: US 7,379,857 B2
(45) Date of Patent: May 27, 2008

(54) METHOD AND SYSTEM FOR SIMULATING COMPUTER NETWORKS TO FACILITATE TESTING OF COMPUTER NETWORK SECURITY

(75) Inventor: Albert L. Piesco, Sterling, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 790 days.

(21) Appl. No.: 10/143,390

(22) Filed: May 10, 2002

(65) Prior Publication Data
US 2003/0212908 A1    Nov. 13, 2003

(51) Int. Cl.
*G06F 9/455* (2006.01)
(52) U.S. Cl. ............................. 703/21; 703/13; 703/22; 703/23; 709/220; 709/221; 709/223; 709/224; 709/232; 713/100; 713/152; 370/241; 370/254; 726/22; 726/25
(58) Field of Classification Search .................. 703/21, 703/13, 22; 726/1, 23, 25, 22; 715/734, 715/735, 736; 709/220–224, 232; 713/100, 713/152; 370/241, 254
See application file for complete search history.

(56) References Cited

U.S. PATENT DOCUMENTS

| | | | | |
|---|---|---|---|---|
| 5,751,967 A | * | 5/1998 | Raab et al. ................. | 709/228 |
| 5,898,830 A | * | 4/1999 | Wesinger et al. ............. | 726/15 |
| 5,907,696 A | * | 5/1999 | Stilwell et al. ............... | 703/13 |
| 5,919,258 A | * | 7/1999 | Kayashima et al. .......... | 726/23 |
| 5,958,024 A | * | 9/1999 | Battat et al. ................. | 709/224 |
| 6,026,442 A | * | 2/2000 | Lewis et al. ................. | 709/229 |
| 6,070,244 A | * | 5/2000 | Orchier et al. ................ | 726/1 |
| 6,301,668 B1 | * | 10/2001 | Gleichauf et al. ............ | 726/25 |
| 6,330,005 B1 | * | 12/2001 | Tonelli et al. ............... | 715/735 |

(Continued)

FOREIGN PATENT DOCUMENTS

WO    WO 01/39379 A2  *  5/2001

(Continued)

OTHER PUBLICATIONS

Comdisco Systems, Inc, Block Oriented Network Simulator (BONeS), Aug. 1990, Comdisco Systems, Inc., 1-6.*

(Continued)

*Primary Examiner*—Hugh Jones
*Assistant Examiner*—Kibrom K Gebresilassie
(74) *Attorney, Agent, or Firm*—Oliff & Berridge, PLC

(57) ABSTRACT

A method and system for simulating computer networks and computer network components to test computer network security is disclosed. A user specifies a desired configuration of a simulated computer network by using a configuration manager. The user also defines all the network components within the simulated computer network by specifying whether a component should be provided in hardware or should be simulated via software. Upon receiving the above-mentioned information from the user, the configuration manager acquires the required hardware resources from a hardware inventory. The configuration manager utilizes an interface switch that connects the hardware in the hardware inventory to produce the desired network layout. Next, the specified configuration for each of the network components is pushed into the acquired hardware resources. Computer network components to be simulated with software are subsequently initialized by the configuration manager. At this point, the user can use the simulated computer network for real-time testing of network security.

16 Claims, 4 Drawing Sheets

U.S. PATENT DOCUMENTS

| | | | |
|---|---|---|---|
| 6,343,362 B1* | 1/2002 | Ptacek et al. | 726/23 |
| 6,393,386 B1* | 5/2002 | Zager et al. | 703/25 |
| 6,453,345 B2* | 9/2002 | Trcka et al. | 709/224 |
| 6,532,237 B1* | 3/2003 | Or et al. | 370/396 |
| 6,549,882 B1* | 4/2003 | Chen et al. | 703/21 |
| 6,611,867 B1* | 8/2003 | Bowman-Amuah | 709/224 |
| 6,636,972 B1* | 10/2003 | Ptacek et al. | 726/6 |
| 6,654,782 B1* | 11/2003 | O'Brien et al. | 709/201 |
| 6,654,882 B1* | 11/2003 | Froutan et al. | 713/153 |
| 6,877,041 B2* | 4/2005 | Sullivan et al. | 709/238 |
| 6,941,467 B2* | 9/2005 | Judge et al. | 726/22 |
| 7,073,198 B1* | 7/2006 | Flowers et al. | 726/25 |
| 7,133,906 B2* | 11/2006 | Price et al. | 709/220 |
| 7,228,566 B2* | 6/2007 | Caceres et al. | 726/25 |
| 7,237,138 B2* | 6/2007 | Greenwald et al. | 714/4 |
| 2001/0034847 A1* | 10/2001 | Gaul, Jr. | 713/201 |
| 2002/0035698 A1* | 3/2002 | Malan et al. | 713/201 |
| 2002/0052725 A1* | 5/2002 | Wasynczuk et al. | 703/22 |
| 2002/0184349 A1* | 12/2002 | Manukyan | 709/221 |
| 2002/0184528 A1* | 12/2002 | Shevenell et al. | 713/201 |
| 2003/0051026 A1* | 3/2003 | Carter et al. | 709/224 |
| 2003/0051163 A1* | 3/2003 | Bidaud | 713/201 |
| 2003/0070003 A1* | 4/2003 | Chong et al. | 709/330 |
| 2003/0115036 A1* | 6/2003 | Chen | 703/21 |
| 2003/0125924 A1* | 7/2003 | Lines et al. | 703/20 |
| 2003/0172145 A1* | 9/2003 | Nguyen | 709/223 |
| 2003/0182582 A1* | 9/2003 | Park et al. | 713/201 |
| 2003/0204672 A1* | 10/2003 | Bergsten | 711/114 |
| 2003/0212890 A1* | 11/2003 | Dircks et al. | 713/164 |
| 2004/0054807 A1* | 3/2004 | Harvey et al. | 709/243 |
| 2005/0193103 A1* | 9/2005 | Drabik | 709/221 |
| 2006/0253902 A1* | 11/2006 | Rabadan et al. | 726/13 |

FOREIGN PATENT DOCUMENTS

WO    WO 02/44871 A2 * 6/2002

OTHER PUBLICATIONS

Xinjie Chang, Netwrok Simulations With OPNET, 1999, Proceedings of the 1999 Winter Simulation Conference, 307-314.*

T. G. Champion, and R. S. Durst, Air Force Intrusion Detection System Evaluation Environment, 2000. pp. 1-13.*

Comdisco Systems, Inc, Block Oriented Network Simulator (BONeS), Aug. 1990, Comdisco System, Inc., 1-6.*

T. G. Champion, and R. S. Durst, "Air Force Intrusion Detection System Evaluation Environment," 2000, pp. 1-13, extra sheet showing the creation of the PDF.*

S. Rooney, C. Hortnag, J. Krause, "Automatic VLAN creation based on on-line measurement," ACM SIGCOMM, pp. 50-57.*

D. Apostal, T. F. Lennox, T. Markham, A. Dowd, R. Lu, D. O'Brien, "Checkmate Network Security Modeling," 2001 IEEE, pp. 214-226.*

* cited by examiner

METHOD AND SYSTEM FOR SIMULATING COMPUTER NETWORKS TO FACILITATE TESTING OF COMPUTER NETWORK SECURITY

The present invention was made under government contract CTC-P-99-166 with NSA.

BACKGROUND OF THE INVENTION

1. Technical Field

The present invention relates to computer simulations in general, and in particular to a method and system for simulating computer networks and computer network components. Still more particularly, the present invention relates to a method and system for simulating a computer network to facilitate testing of computer network security.

2. Description of the Related Art

As more and more computer networks are linked to each other through open computer connections such as the Internet, the demand for computer network security has also increased accordingly. When using a computer network, most computer users, including both home and business users, want to protect the data in their computer systems from unauthorized accesses. Current attempts to keep data secure within a computer network involve both hardware and software solutions. Hardware solutions typically include filtering data and blocking access from users outside of a trusted computer network. Software solutions typically include monitoring network data, performing authentication, and monitoring network traffic to detect unauthorized intrusion attempts.

Despite all the efforts used to secure data within a computer network, some skillful unauthorized users, such as hackers, may still be able to penetrate all network security measures within the computer network. Often times unauthorized users would exploit unexpected behavior in a network security component to gain initial access. In order to reduce the probability of unauthorized intrusions and accesses to a computer network, a computer network owner or an authorized third party may test the integrity of the computer network from a network security standpoint by, for example, attempting to gain access to the computer network in a manner similar to an unauthorized user. Hopefully, the test results can provide some information to allow the computer network administrator to locate all the network security loopholes within the computer network such that the computer network can be augmented with a higher level of network security.

The prior art methods for testing computer network security include the actual usage of an entire computer network or the simulation of an entire computer network via software simulation. However, each of the above-mentioned prior art methods has its own drawbacks. For example, the actual usage of an entire computer network to examine network security requires creating a replication of the computer network, exposes sensitive information to third parties, burdens the computer network, and/or may cause network instability. The usage of software simulations generally does not provide real-time results or the fidelity of an actual computer network. Consequently, it would be desirable to provide an improved method and system for simulating a computer network in order to on facilitate the testing of computer network security.

SUMMARY OF THE INVENTION

In accordance with a preferred embodiment of the present invention, a user specifies a desired configuration of a simulated computer network by using a configuration manager. The user also defines all the network components within the simulated computer network by specifying whether a component should be provided in hardware or should be simulated via software. Upon receiving the above-mentioned information from the user, the configuration manager acquires the required hardware resources from a hardware inventory. The configuration manager utilizes an interface switch that connects the hardware in the hardware inventory to produce the desired network layout. Next, the configuration for each of the specified network components is pushed into the acquired hardware resources. Computer network components to be simulated with software are subsequently initialized by the configuration manager. At this point, the user can use the simulated computer network to test network security in real-time.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
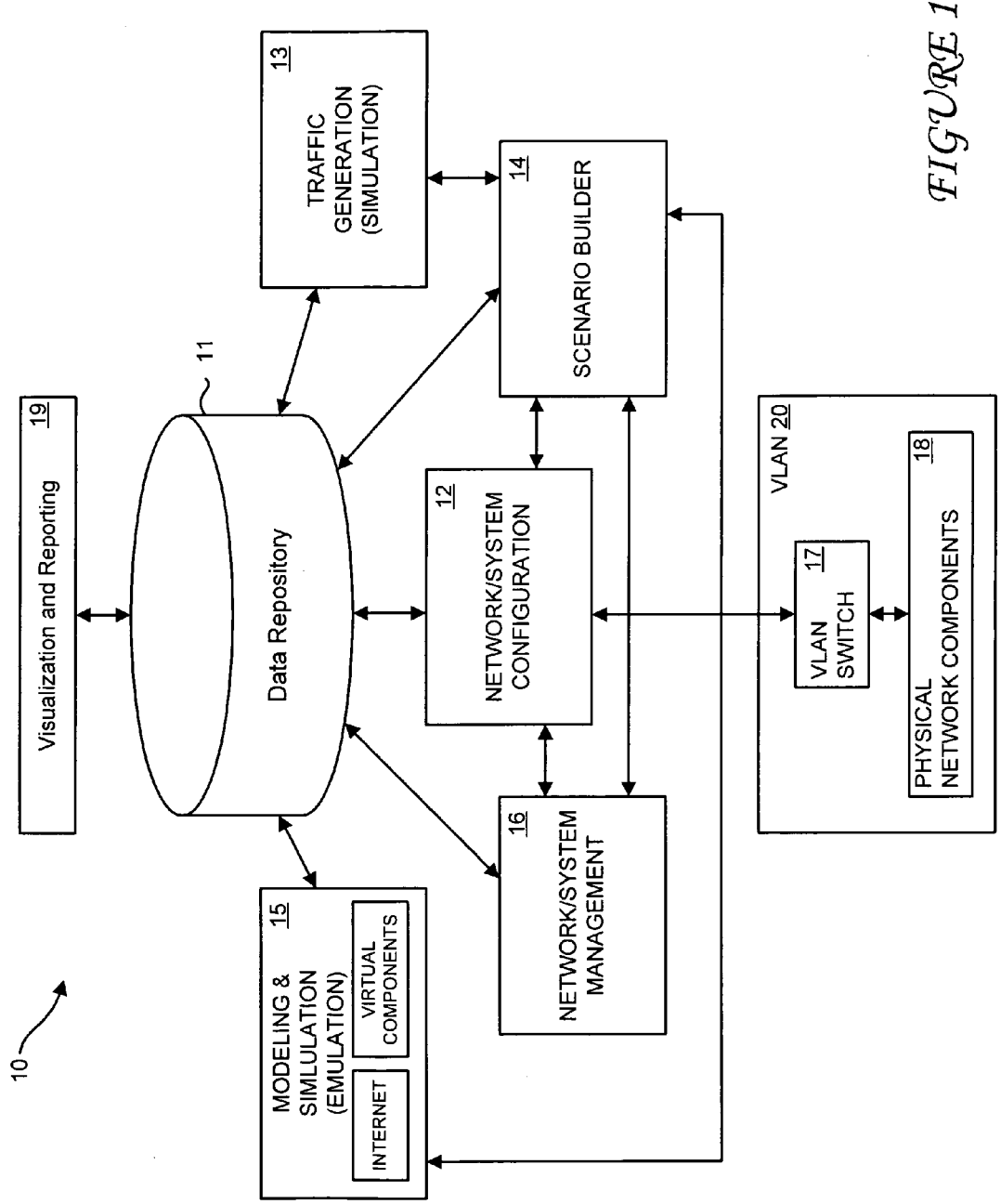
FIG. 1 is a block diagram of the logical architecture of a network emulator/simulator, in accordance with a preferred embodiment of the present invention.

Referring now to the drawings and in particular to FIG. 1, there is depicted a block diagram of the logical architecture of a network emulator/simulator, in accordance with a preferred embodiment of the present invention. As shown, a network emulator/simulator 10 includes a data repository 11, a network/system configuration module 12, a traffic generation module 13, a scenario builder module 14, a modeling & simulation module 15, and a network/system management module 16. In addition, network/system configuration module 12 is coupled to a virtual local-area network (VLAN) 20 that includes a VLAN switch 17 and a group of physical network components 18. Network emulator/simulator 10 allows multiple real-time network modeling and simulation analyses to be performed simultaneously or in rapid succession. The results from the network modeling and simulation can be presented to a user via a visualization and reporting module 19.

Data repository 11 collects and stores various types of data that are related to real-time network modeling and simulation. The types of data stored within data repository 11 may include experiment definition, system image files, configuration files, hardware and software inventories, system and application log files, etc.

Network/system configuration module 12 defines network configurations and configures network components and systems. Network/system configuration module 12 also allocates resources to various activities, and produces configuration files for a domain name server (DNS), a dynamic host configuration protocol (DHCP) server, and VLAN 20.

Traffic generation module 13 and modeling & simulation module 15 can be collectively referred to as Sybil. Sybil, as the name implies, has the ability to assume multiple personalities. In modeling & simulation module 15, Sybil can assume the identity of more than 400 operating systems. These identities, while housed within one computer system, appear to be individual computer systems on the simulated computer network. When probed by network tools, the emulated network components respond as though they are in fact separate computer systems, allowing for a virtual environment that appears to be real. The emulated network components represent servers on the computer network. The Sybil components are active real-time device representations that can be used to generate a virtual network that uses the same protocols as actual devices and can communicate with the active devices in real-time.

Scenario builder module 14 provides a graphical user interface (GUI) for defining network configurations, a historical repository for configurations, a function for allocating resources to activities, and a function for generating configuration files. Scenario builder module 14 provides a list of asset types, which can be referred to as asset classes and represent physical assets only. Scenario builder module 14 provides a form to define the requirements for a scenario and to request a particular scenario execution time. Scenario builder module 14 provides scheduling for analyzes based on its priority and asset availability. Scenario builder module 14 generates configuration files required for the DNS, DHCP server, and VLAN 20. By applying the above-mentioned configuration files, a test laboratory is configured such that correct resources can be placed in the correct network components within VLAN 20 for performing various laboratory experiments. Scenario builder module 14 also controls traffic flow and uses enhanced Open Source tools to inject traffic-packets into the simulated network environment. Such feature allows a user some form of control during the execution of the scenario while data is automatically collected to reflect the steps of the user.

Network/system management module 16 monitors the status of network emulator/simulator 10 by utilizing various software, such as network mapping software, asset management software, performance measurement software, storage management software, and security management software. Specifically, network mapping software identifies all resources on the simulated network. Network mapping software also ensures network configuration and verifies network resource operations. Asset management software tracks resources and their attributes. All software, hardware, and network configurations may be tracked. In addition, asset management software provides the information required to configure and to replay a scenario. Performance measurement software performs analysis of network traffic in terms of content and throughput. Performance measurement software may monitor the link status and performance between distributed nodes when scenarios rely on network devices or systems from more than one node. Storage management software allows system configurations to be stored for future reuse and provides a backup/disaster recovery capability. To replay an activity, the previous network configuration must be duplicated. When the scenario needs to be replayed, the system images and configuration files are pushed to the appropriate resources IS to reconfigure the simulated computer network.

VLAN 20 includes a group of workstations, servers, and other network resources acting as a single network segment despite the physical arrangement. The logical grouping of network resources and VLAN switch 17 allows easy reconfiguration within an existing cabling structure. For example, a workstation can be interacted as though connected to the same physical LAN despite the actual physical layout of the computer network. VLAN switch 17 (or, more generally, an interface switch) is defined as a multi-port device that transfers data between its different ports based on the destination addresses and/or other information found in the individual packets VLAN switch 17 receives. VLAN switch 17 may be used to segment LANs, connect different LANs, or extend the collision diameter of LANs. VLAN switch 17 is of particular importance to Ethernet-based LANs because of its ability to increase network diameter and physically segment the simulated computer network.

Visualization and reporting module 19 allows a user to visualize network configuration and to analyze data. Visualization and reporting module 19 includes a GUI within network emulator/simulator 10 for scenario definition. Additional views that can be displayed include, but are not limited to, network discovery and performance measurements. In addition, visualization and reporting module 19 generates reports to meet the needs of a user. Those reports may include hardware and software inventory, details of past scenarios, results of scenario execution, etc.

Figure 2:
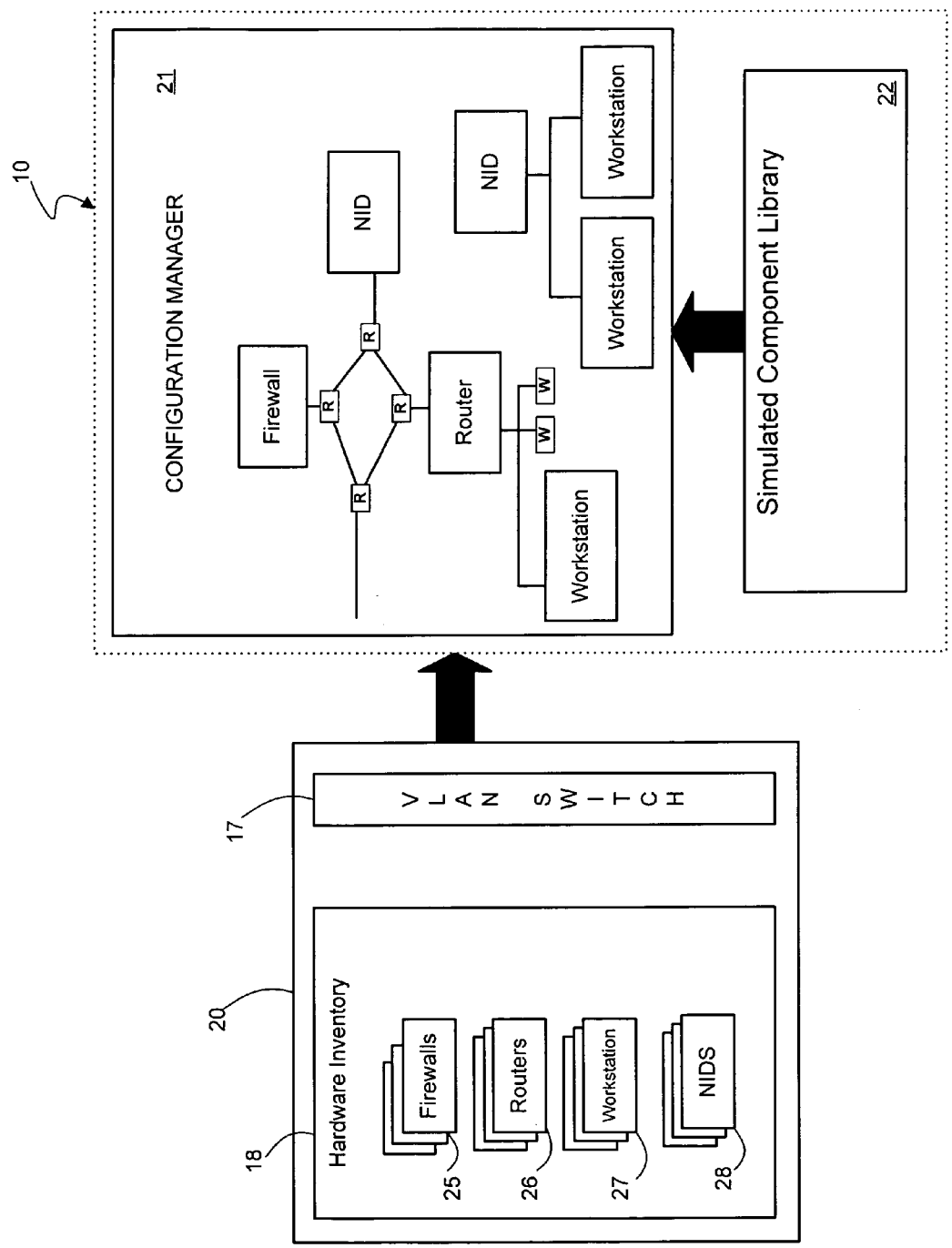
FIG. 2 is a detailed block diagram illustrating the relationship between the network emulator/simulator and the VLAN from FIG. 1, in accordance with a preferred embodiment of the present invention.

With reference now to FIG. 2, there is illustrated a detailed block diagram illustrating the relationship between network emulator/simulator 10 and VLAN 20, in accordance with a preferred embodiment of the present invention. As shown, network emulator/simulator 10 includes a configuration manager 21 and a simulated component library 22. Preferably, configuration manager 21 is part of network/system configuration module 12 from FIG. 1, and simulated component library 22 is stored within data repository 11 from FIG. 1. Physical network components 18 within VLAN 20 can be categorized into a hardware inventory. In this example, the hardware inventory may include physical network components such as firewalls 25, routers 26, workstations 27, and network intrusion detection systems (NIDS) 28. Configuration manager 21 interacts with VLAN switch 17 to configure various network components within the hardware inventory. Configuration manager 21 also interacts with simulated component library 22 to provide software simulations of various network components.

During operation, network emulator/simulator 10 can modify an existing network scenario or create a new network scenario for an experiment, such as the testing of network security. Network emulator/simulator 10 identifies a network configuration and its required resources, produces configuration files for the reconfiguration of VLAN switch 17, DNS and DHCP server, and produces a checklist of actions to be performed for the experiment. Configuration manager 21 acquires the resources automatically from both software inventory and hardware inventory, and performs actions such as pushing the required operating system images to workstations and servers, loading additional applications as needed, uploading configuration files to VLAN switch 17, DNS, and DHCP server, and resetting workstations and servers to obtain new Internet protocol (IP) address to join the correct VLAN.

Configuration manager 21 enables a user who conducts experiments to control the frequency and the amount of traffic simulation. Traffic simulation is a critical component in that it simulates the background traffic of a real computer network environment. It is possible to monitor existing networks and replay the traffic through the traffic simulator for a more realistic view of the computer network. Configuration manager 21 releases activity resources and returns them to the hardware inventory. Configuration manager 21 updates the database to indicate that the resources are available, and generates the configuration files that are required to reconfigure VLAN switch 17, DNS and DHCP server to show these resources as part of the hardware inventory.

Operating systems and applications are downloaded to the assigned components and the configuration of each assigned component is loaded based on the definition supplied in scenario builder module 14 (from FIG. 1). Laboratory resources not assigned to a network scenario are automatically assigned to the hardware inventory VLAN. Therefore, all network scenarios have a "Hardware Inventory Segment" VLAN defined as part of the switch configuration. Such VLAN is automatically generated when a network scenario is created. Scenario builder module 14 generates an emulation and simulation configuration file to configure the traffic requirements defined in the network scenario.

Emulated devices are those servers found on a network. One system can be configured to reflect many servers using the emulation component of the network emulator/simulator custom software. Operating system specific services are emulated with their appropriate responses to communication requests. Simulation is used in traffic generation to refer to the network traffic that passes between workstations, servers, and devices. Such traffic may be a replay of a network's recorded traffic or it may be generated using the simulation component. Network packet traffic may be inserted into the simulated traffic to determine responses to physical machines as well as the emulated and simulated components. The simulated traffic represents many components on a computer network similar to the workstations.

Figure 3:
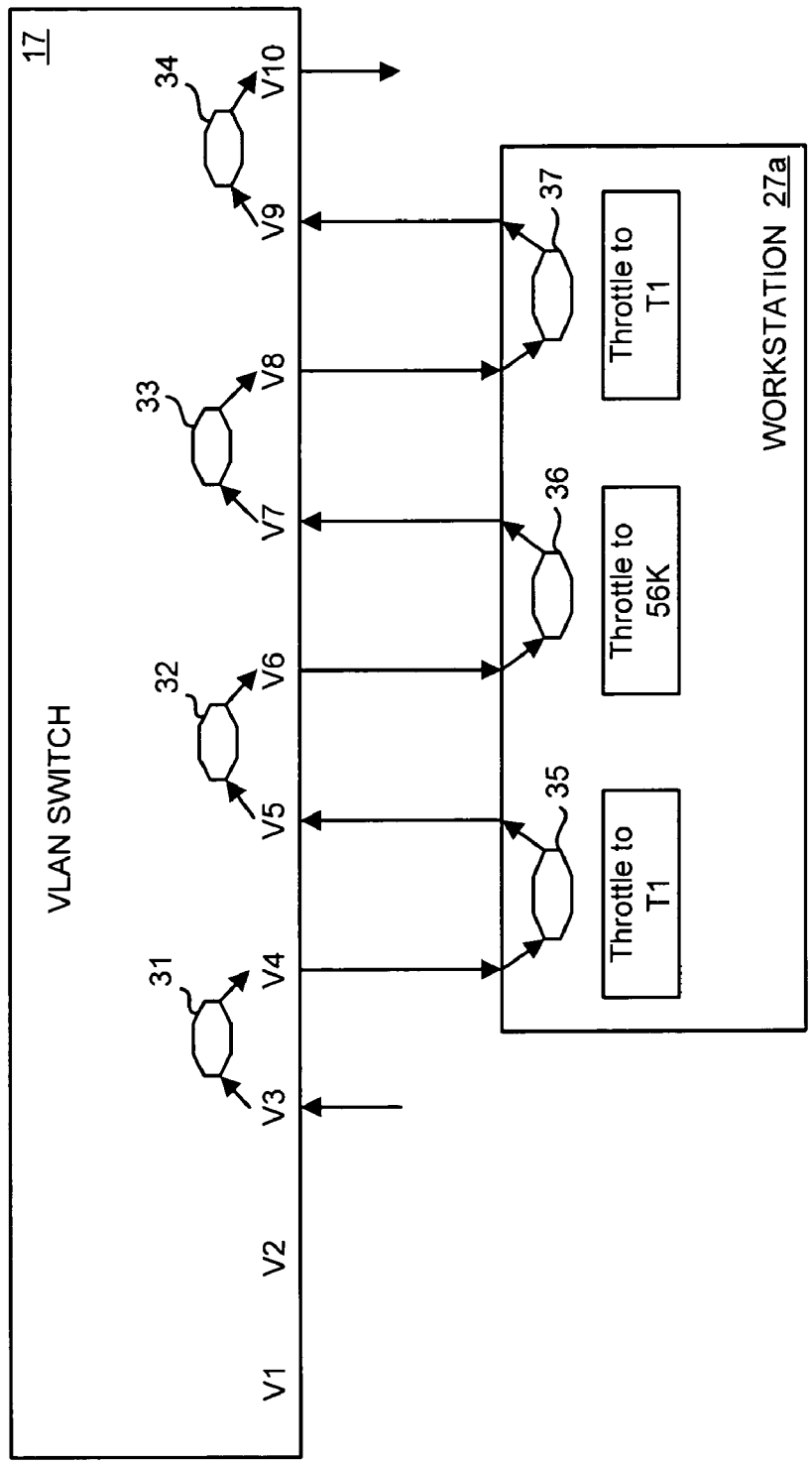
FIG. 3 is a block diagram of a VLAN switch interfaced with a workstation, in accordance with a preferred embodiment of the present invention.

The Internet may be emulated using a combination of VLAN switch 17 and one of workstations 27 within physical network components 18. Referring now to FIG. 3, there is depicted a block diagram of VLAN switch 17 interfaced with a workstation 27a, in accordance with a preferred embodiment of the present invention. VLAN switch 17 contains routers 31, 32, 33 and 34 connected to VLAN ports V3-V4, V5-V6, V7-V8 and V9-V10, respectively. Workstation 27a is configured as a router and bandwidth throttler between its network input connections and network output connections. In this example, workstation 27a includes routers 35-37. Routers 35 and 37 are controlled by bandwidth throttlers (software) to emulate T1 connections to the Internet. Similarly, router 36 is controlled by a bandwidth throttler to emulate a 56 kbs modem connection to the Internet. Test data enter VLAN switch 17 through VLAN port V3 and exit through VLAN port V10. Routers 35-37 emulate the traffic that test data would traverse in the Internet backbone. Bandwidth throttlers are used to adjust the speed and bandwidth of the traffic congestion, and varying delays and speeds that traffic experiences as packets flow through the Internet backbone, routers and various network components.

Figure 4:
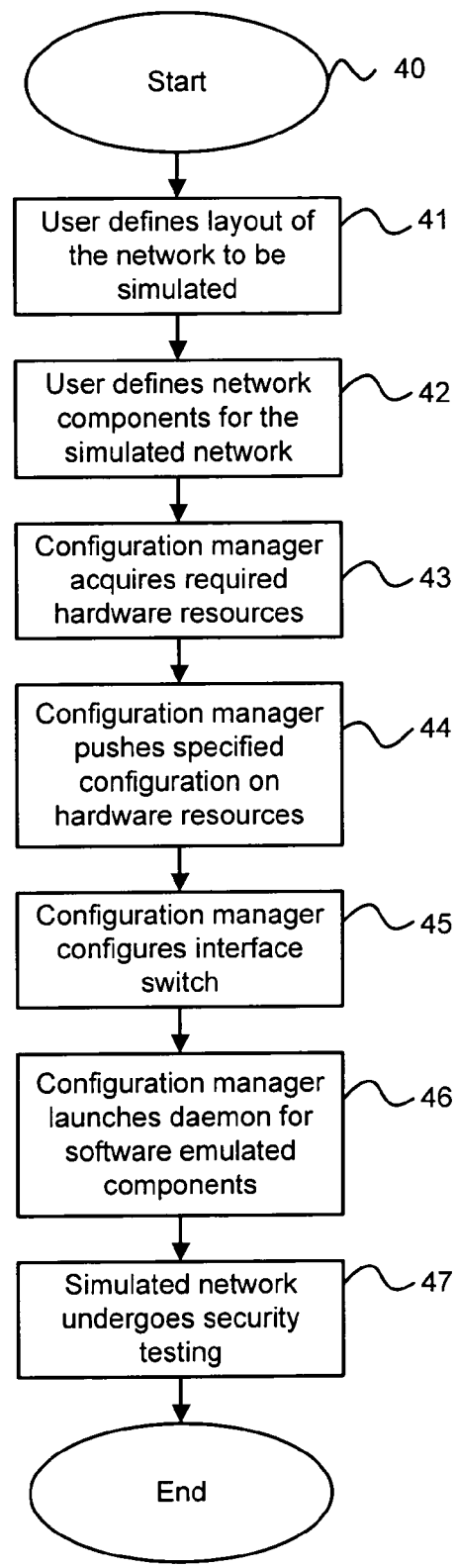
FIG. 4 is a high-level logic flow diagram of a method for simulating computer networks to test computer network security, in accordance with a preferred embodiment of the present invention.

Referring now to FIG. 4, there is depicted a high-level logic flow diagram of a method for simulating computer networks and computer network components to test computer network security, in accordance with a preferred embodiment of the present invention. Starting at block 40, a user defines a desired layout of the computer network to be simulated, as shown in block 41. The user then specifies what network components need to be emulated with hardware and what network components need to be simulated by software, as depicted in block 42. Specifically, the user specifies the hardware requirements of the simulated computer network, and the network components that need to be emulated with hardware and to be simulated by software. Depending on the type of testing to which the simulated computer network is subjected, it is not necessary to emulate all network components with hardware or simulate all network components by software.

Once a particular configuration of a simulated computer network has been specified, a configuration manager within a network emulator/simulator, such as network emulator/simulator 10 from FIG. 1, acquires the required hardware resources, as depicted in block 43. Acquiring hardware resources involves allocating hardware networking components from a hardware inventory of the network emulator/simulator. Physical hardware resources such as workstations, routers, and firewalls are hardware resources that can be allocated for the simulated computer network. Next, the configuration manager "pushes" a specified configuration on acquired hardware resources, as depicted in block 34. Pushing a configuration on the hardware resource involves loading software, such as operating systems and/or application programs, into workstations and configuring various types of servers, such as DNS or DHCP server, accordingly. Those skilled in the art will appreciate that pushing a configuration on a network component refers generally to a configuration of hardware. After producing a configuration file for an interface switch, the configuration manager configures the interface switch to emulating the network layout with the acquired hardware, as shown in block 45. The interface switch allows for the simulation of a particular network layout without the need to physically rewire a computer network.

Next, the configuration manager launches a daemon for controlling software simulated network components, as depicted in block 46. The daemon spawns threads for each network component to be simulated, and the daemons also directs traffic between the simulated computer network and the threads, as required.

At this point, the simulated computer network is ready for the user to perform network security testings. If the user wishes to test only the firewalls in a computer network, there is no need to use hardware for simulating workstations. Similarly, if a user wishes to test the security of only a particular workstation, the particular workstation may be simulated by hardware while the remaining network components, such as firewalls and routers, may be simulated with software. By simulating some network components with software, the required size of the hardware inventory is reduced. In addition, the usage of software to simulate hardware components allows for the simulation of larger computer networks while preserving the fidelity of actual hardware response in testing.

As has been described, the present invention provides an improved method and system for simulating computer networks and computer network components to test computer network security. The computer system is specifically designed to conduct real-time analysis of computer network traffic in various network architectures rapidly and repeatably. The present invention provides the ability to take a network environment and simulate the network components as well as emulate system components without actually having all of those network components physically present. With the present invention, a network environment of tens, hundreds, or thousands of servers, workstations, and network components can be replicated without physically possessing the hardware. The traffic from background workstations is simulated using the traffic generation component, servers and their associated services are emulated using the modeling and simulation component, focal points such as specific workstations or servers are configured on static devices. During execution, the scenario controller component is used by individuals conducting the analyses to modify scenario parameters such as types and volume of traffic as well as to inject network packets into the traffic stream.

While the invention has been particularly shown and described with reference to a preferred embodiment, it will be understood by those skilled in the art that various changes in form and detail may be made therein without departing from the spirit and scope of the invention.

What is claimed is:

1. A method for simulating a computer network in order to facilitate testing computer network security, said method comprising:

providing a hardware inventory of physical network components;

providing a software library of simulated network components;

receiving a specific user-defined computer network configuration for testing network security of said specific user-defined network configuration, a user defining all the physical network components and the simulated network components needed to simulate the user-defined network;

in response to the receipt of said specific user-defined computer network configuration to be simulated, selectively acquiring only the user defined physical network components from said hardware inventory, and selectively acquiring only the user defined simulated network components from said software library to create a simulated computer network;

configuring said acquired physical network components within said simulated computer network via an interface switch;

configuring said acquired simulated network components within said simulated computer network via a plurality of daemons;

performing computer network security tests in real-time on said simulated computer network having said acquired physical network components and said simulated network components; and displaying results of said computer network security tests to the user.

2. The method of claim 1, wherein said method further includes pushing a configuration on said acquired physical network components.

3. The method of claim 1, wherein said hardware inventory includes one or more routers.

4. The method of claim 1, wherein said hardware inventor includes one or more firewalls.

5. The method of claim 1, wherein said hardware inventory includes one or more workstations.

6. The method of claim 1, wherein said interface switch is a local area network switch.

7. A computer system capable of simulating a computer network in order to facilitate testing computer network security, said computer system comprising:

a hardware inventory of physical computer network components;

a software library containing a plurality of simulated computer network components;

means for receiving a specific user-defined computer network configuration for testing network security of said specific user-defined network configuration. a user defining all the physical network components and all the simulated network components needed to simulate the user-defined network;

a configuration manager, in response to the receipt of said specific user-defined computer network configuration to be simulated, for selectively acquiring only the user defined physical computer network components from said hardware inventory, and selectively acquiring only the user defined simulated network components from said software library to construct a simulated computer network;

an interface switch for selectively establishing logical links between said configuration manager and at least one of said physical computer network components within said inventory of physical computer network components, in accordance with said specific computer network configuration;

a plurality of daemons for selectively configuring said simulated network components within said software library, in accordance with said specific computer network configuration; and a visualization and reporting module for displaying results of said computer network security tests to the user.

8. The computer system of claim 7, wherein said inventory of physical computer network components includes one ore more routers.

9. The computer system of claim 7, wherein said inventory of physical computer network components includes one ore more firewalls.

10. The computer system of claim 7, wherein said inventory of physical computer network components includes one ore more workstations.

11. The computer system of claim 7, wherein said interface switch is a local-area network switch.

12. The computer system of claim 7, wherein said configuration manager includes a network/system configuration module, a network/system management module and a scenario builder module.

13. The method of claim 1, wherein said method further includes receiving a list of network components within said specific computer network configuration which are to be emulated with hardware; and receiving a list of network components within said specific computer network configuration which are to be simulated by software.

14. The computer system of claim 7, wherein said computer system further includes further includes means for receiving a list of network components within said specific computer network configuration which are to be emulated with hardware; and means for receiving a list of network components within said specific computer network configuration which are to be simulated by software.

15. The computer system of claim 7, wherein said interface switch is configured by a configuration manager.

16. The computer system of claim 7, wherein said plurality of daemons are launched by said configuration manager.

\* \* \* \* \*